(12) United States Patent
Burrell et al.

(10) Patent No.: US 10,515,005 B1
(45) Date of Patent: Dec. 24, 2019

(54) SYSTEMS AND METHODS FOR TESTING SOURCE CODE

(71) Applicants: Atlassian Pty Ltd, Sydney, New South Wales (AU); Atlassian, Inc., San Francisco, CA (US)

(72) Inventors: Nathan Wayne Burrell, Woy Woy (AU); Jeroen Paul Magdalena De Raedt, Darlington (AU); Kenneth Iain Macleod, Wollstonecraft (AU); Matthew Joseph Watson, Annandale (AU); Raul Gomis Hidalgo, Potts Point (AU); Samuel Joseph Tannous, Moorebank (AU)

(73) Assignees: Atlassian Pty Ltd, Sydney (AU); Atlassian, Inc., San Francisco, CA (US)

( * ) Notice: Subject to any disclaimer, the term of this patent is extended or adjusted under 35 U.S.C. 154(b) by 0 days.

(21) Appl. No.: 16/457,384

(22) Filed: Jun. 28, 2019

Related U.S. Application Data

(60) Provisional application No. 62/783,040, filed on Dec. 20, 2018.

(51) Int. Cl.
*G06F 11/36* (2006.01)
*G06F 8/41* (2018.01)
*G06F 8/71* (2018.01)

(52) U.S. Cl.
CPC ............ *G06F 11/3688* (2013.01); *G06F 8/41* (2013.01); *G06F 8/71* (2013.01)

(58) Field of Classification Search
CPC .......... G06F 11/3688; G06F 8/41; G06F 8/71
See application file for complete search history.

(56) References Cited

U.S. PATENT DOCUMENTS

| | | | | |
|---|---|---|---|---|
| 8,392,886 B2* | 3/2013 | Sweis | ................ | G06F 11/3688 717/124 |
| 9,794,343 B2* | 10/2017 | Hebert | ................ | G06F 9/5038 |
| 10,216,512 B1* | 2/2019 | Mathew | ................ | G06F 8/41 |
| 10,223,246 B2* | 3/2019 | Pasala | ................ | G06F 11/3684 |
| 10,303,586 B1* | 5/2019 | Falko | ................ | G06F 11/3636 |
| 2015/0169383 A1* | 6/2015 | van den Berghe | ... | G06F 9/5094 718/104 |
| 2015/0370554 A1* | 12/2015 | Benedict | ............. | G06F 11/3692 717/101 |
| 2016/0259631 A1* | 9/2016 | Jing | ......................... | G06F 8/36 |
| 2018/0129497 A1* | 5/2018 | Biddle | ................ | G06F 11/3668 |

(Continued)

*Primary Examiner* — Ziaul A Chowdhury
(74) *Attorney, Agent, or Firm* — Hickman Palermo Becker Bingham LLP

(57) ABSTRACT

A continuous integration system and method for testing source code is disclosed. In particular, the continuous integration system allows developers to create predefined tasks for builds—each task comprises information to perform a particular build step. In certain embodiments, developers can select a particular task from a set of built-in tasks to add to their build configuration without having to know or determine the underlying build logic required to perform the task (such as the commands needed to execute the task, the artefacts required for the task, etc.). In particular, the disclosed systems and methods allow developers to add one or more predefined tasks in their build configuration, without adding the build logic associated with the task in the configuration file.

20 Claims, 3 Drawing Sheets

(56) References Cited

U.S. PATENT DOCUMENTS

2018/0137032 A1* 5/2018 Tannous .............. G06F 11/3664
2018/0150487 A1* 5/2018 Olivier ...................... G06F 8/36
2018/0260312 A1* 9/2018 Strachan ............. G06F 11/3688
2018/0300163 A1* 10/2018 Baskaran .................. G06F 8/41

* cited by examiner

US 10,515,005 B1

SYSTEMS AND METHODS FOR TESTING SOURCE CODE

BENEFIT CLAIM

This application claims the benefit under 35 U.S.C. § 119(e) of provisional application 62/783,040, filed Dec. 20, 2018, the entire contents of which are hereby incorporated by reference for all purposes as if fully set forth herein.

TECHNICAL FIELD

Aspects of the present disclosure are directed to continuous integration systems and to executing tasks in continuous integration systems.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Continuous integration (CI) is a software development practice that requires software developers to periodically integrate source code into a shared repository. The shared repository is usually managed by a source code management (SCM) system (also called revision-control or version-control system) that tracks and manages source code as it is written and revised. The revisions (also called commits) added to the SCM system are routinely verified by a CI management system—e.g. as and when they are added to the SCM system—allowing software development teams to detect and correct problems early.

Given different types and versions of computer systems, software developers often require their software applications to work in different environments (e.g., different operating systems, platforms, databases, or programs). For instance, a given software application may be required to be run on WINDOWS, OS400, AIX, LINUX, etc. Similarly, there may be interest in deploying the source code to different testing environments such as testing, staging, or live environments or to test the source code using different types of testing tools. In addition, developers may want to receive notifications of CI executions via different mediums. Typically, developers provide detailed information including commands and build logic for the particular environment, testing tools, and/or notification mechanisms they wish the CI management system to employ.

However, software developers often find it difficult to find/know the detailed information including the commands and logic required to perform these functions.

SUMMARY

The appended claims may serve as a summary of the invention.

Figure 1:
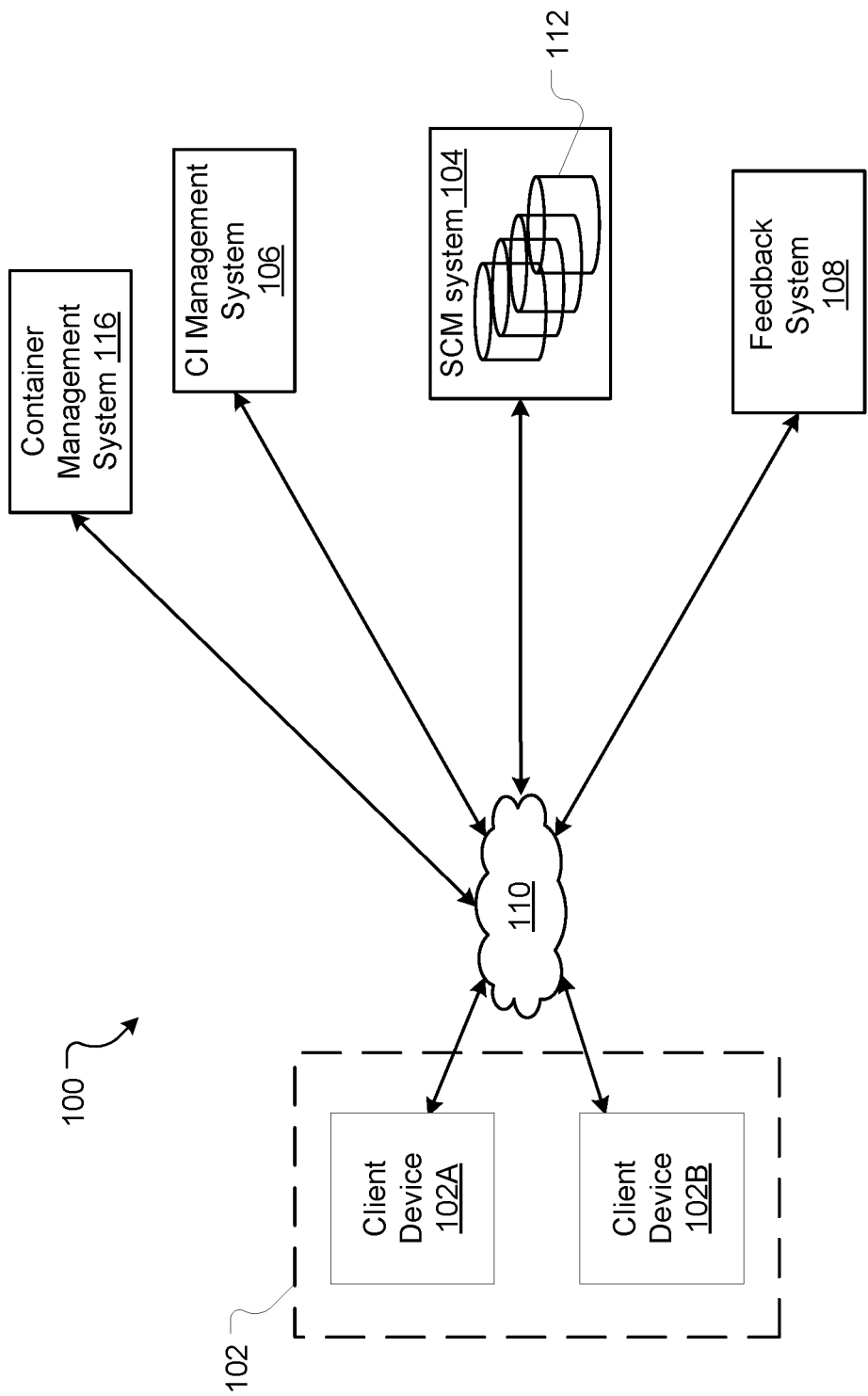
FIG. 1 is a block diagram illustrating a network environment in which aspects of the present disclosure may be implemented.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

Overview

In the following description, for the purposes of explanation, numerous specific details are set forth to provide a thorough understanding of the present invention. It will be apparent, however, that the present invention may be practiced without these specific details. In some instances, well-known structures and devices are shown in block diagram form to avoid unnecessary obscuring.

As noted previously, continuous integration (CI) is the practice of merging working copies of source code from multiple software developers into a shared repository periodically and then using a CI management system to verify the updated source code. The CI management system notifies developers if the source code is successfully verified or if any problems exist with the source code, allowing developers to correct errors as and when they are encountered, thereby reducing rework, cost, and time spent correcting errors at later stages.

CI management systems typically verify source code revisions (also called commits) by performing a number of automated tests on the source code such as source code style checks, static code analysis, build tests, unit tests, integration tests, performance tests, etc.

The tests are typically run in test environments selected by developers. A test environment usually consists of software and hardware on which a software application is tested. The software may include an operating system, a database server, a browser (if web application), or any other software components required to run the software application. Typically, the test environment replicates/simulates the actual live/production environment on which a software application is finally deployed. If a source code is written for a particular production environment (for example an environment running a Windows2007 operating system, an Oracle database, and a Google Chrome web browser), the developers may instruct the CI management system to test the source code in a test environment similar to that production environment.

In some implementations, CI management systems utilize virtual machines (VM) to execute the tests/builds. The VMs may be configured to provide individual test environments. Then, depending on the test environment specified for a particular integration, the CI management system may invoke a VM that hosts the corresponding test environment into a physical device and run tests using that VM. Using VMs, CI management systems can utilize the same physical device to run multiple test environments.

When using VMs, CI management systems typically store and manage 'VM images'. Generally, a VM image is a copy of a hard drive representing a test environment that is used as a template for creating VM instances (also called containers). CI management systems often provide a single image with multiple executable files to offer variations of an environment (such as different versions of an operating system, different types of web browsers or databases, etc.). This simplifies VM image management, but ends up creating very bulky images.

In order to setup automated tests or builds, developers are often required to provide build configurations—i.e., a collection of settings used to start a particular build and/or a sequence of builds (each called a build step). For each build step, the build configuration may include, for example, information about the VM image that is to be used, information about resources that need to be provisioned, a list of commands that need to be executed to perform the build/test, information about files that are produced as a result of the build/test (such as reports, source code files, etc.), and/or run parameters (such as passwords, keys, etc. for executing the task) that are passed to the container for executing the build.

In a simple example, a build configuration may include a single build step such as deploying source code to an Amazon Web Services (AWS) Elastic Container Service (ECS) container. In complex situations, however, the build configuration may include multiple build steps. In such cases, to create the build configuration, information has to be provided for each build step and this can often be time consuming and difficult. For example, to determine the sequence of commands that are to be executed to perform a particular build step, developers often need to consult documentation provided by, e.g., the CI management system, a cloud service provider, prepared internally by the developer's organization or resort to online searching and this can be time consuming and often even with this level research, developers may not be certain if the commands are correct.

To address this, aspects of the present invention create predefined tasks for builds—each task comprises information to perform a particular build step such as deploying source code to AWS ECS, deploying to Google cloud, deploying to Kubernetes, sending a notification to Slack, trigger an alert using Opsgenie or analysing the code for security vulnerabilities with SourceClear, etc. In certain embodiments, developers can select a particular task from a set of built-in tasks to add to their build configuration without having to know or determine the underlying build logic required to perform the task (such as the commands needed to execute the task, the artefacts required for the task, etc.). In particular, the claimed invention allows developers to add one or more predefined tasks in their build configuration, without adding the build logic associated with the task in the configuration file.

At execution, the build configuration is parsed and the CI management system can automatically add the build logic (which is stored in a central repository), such as commands, artefacts, VM image, etc., associated with one or more tasks present in the build configuration. In addition, the CI management system may be configured to execute each task in a separate container. This prevents any errors or changes caused by one step to affect other build steps and in effect contain the errors/changes to a single build step.

By creating predefined tasks and storing the build logic associated with the task in a central location, systems and methods disclosed herein can reuse the build logic associated with a task in multiple repositories, in multiple branches, etc., without having to include the build logic for the task in the build configuration for each repository/branch. This saves memory usage and allows configuration files to remain simple and small in size. Further, if any changes need to be made to the build logic associated with a particular task, such changes can be made once to the centrally stored build logic without having to update each build configuration that includes the particular task. This reduces errors (as it prevents any differences in the build logic across branches and/or repositories). Further, it allows developers to maintain their build configurations in an easy and time efficient manner.

One example CI management system in which features of the present disclosure may be implemented is Bitbucket Pipelines, which is commercially available from Atlassian. Bitbucket Pipelines is integrated with Bitbucket (Atlassian's SCM system). In the description below, Bitbucket Pipelines is used as an example CI management system and Bitbucket is used as an example SCM system for illustrative purposes. It will be appreciated that the various features and techniques described herein could, with appropriate modifications, be used with alternative CI management systems and SCM systems (e.g., TravisCl, Wercker, Buildkite, and Jenkins)

Environment Overview

FIG. 1 illustrates an environment 100 in which aspects of the present disclosure are implemented. The environment 100 includes one or more client devices 102, a source code management (SCM) system 104, a CI management system 106, and a feedback system 108. The client devices 102, SCM system 104, CI management system 106, and feedback system 108 communicate with each other over one or more communication networks 110.

The SCM system 104 stores source code repositories 112 (hereinafter referred to as repositories 112) and manages their content. It also receives/responds to requests from client devices 102 and the CI management system 106 to retrieve/store data in the repositories 112. For example, the SCM system 104 may notify the CI management system 106 when a user updates source code in a repository 112. In addition, the SCM system 104 may receive a request from the CI management system 106 to access source code from a repository 112 that has recently been updated. The SCM system 104, in response, may retrieve the requested source code and forward it to the CI management system 106.

The repositories 112 may include multiple versions of source code files and associated metadata. Typically, the SCM system 104 stores and manages multiple repositories; however, not all repositories may be registered for CI (i.e., to have their source code verified when source code is updated/revised). To differentiate the repositories registered for CI from the rest of the repositories, in one embodiment, the metadata includes an indicator indicating whether CI is enabled or not. The metadata of CI enabled repositories may also include build configuration files, which include, among other things, the steps for performing a build, and identifiers of one or more predefined tasks. The CI management system 106 (as described in detail below) may be configured to determine whether CI is required for a repository by inspecting the CI indicator in the metadata and, if such an indicator is present, retrieve the associated build configuration file.

The client devices 102 are configured to communicate with the SCM system 104, the CI management system 106, and the feedback system 108. To that end, in certain embodiments, the client devices 102 include various installed applications such as an SCM client (not shown), a CI client (not shown) and/or a web browser (not shown).

The SCM client may be configured to create local working copies of source code; modify the working copies; commit/push changes made in the working copies to the SCM system 104 (so that the changes are written to the relevant repository 112); fetch (e.g. pull) files from a repository 112 the developer has access to; provide a user interface for reading/writing source code and build instructions.

The CI client may be configured to allow communication between the client device 102 and the CI management system 106. For example, it may allow a developer to register an SCM repository 112 for CI with the CI management system 106, and create/edit the build configuration file for the SCM repository 112. In order to aid in creating the build configuration file, the CI client may present a list of predefined tasks (e.g., presenting the names or short descriptions of available predefined tasks), which the developer may select to add into their build configuration. In certain embodiments, the predefined tasks may be classified under categories—related to deployments, related to notifications, etc. When a developer selects a particular task for adding into their configuration file, the CI client may further prompt the developer to provide any run parameters required to eventually execute the task (e.g., credentials of any third party accounts the system has to access in order to execute the task).

In certain embodiments, the CI client may also be utilized to create user defined tasks. For example, a user may utilize the CI client to define a task by providing a task name, a task description, a base VM image for the task, any run parameters required to execute the task, and the script commands to execute the task. When a task is created, it can be submitted to the CI management system 106, which in turn automatically builds a VM image for the task and pushes the VM image for storage. A URL specifying the location of the VM image may be passed back to the developer and may be added as part of the task definition. Once a task is created in this manner, the task name and description may be added to the list of tasks available for other developers to select from their CI client and the entire description of the task is stored in a task definition repository (described later).

Returning to the client devices 102, the web browser may be utilized to, for example, view test results provided by the feedback system 108.

In another embodiment, instead of dedicated SCM and CI clients, the client device 102 simply includes a web browser and communicates with the SCM system 104, the CI management system 106, and the feedback system 108 via the web browser.

Only two client devices (102A and 102B) have been illustrated, but normal operation of the SCM system 104 typically involves many more client devices connected to the SCM system 104 to access data from/write data to repositories 112.

The client devices 102 may communicate with the other systems in environment 100 via suitable communication networks. For example, the client devices 102 may communicate with the SCM system via private or public networks, with the CI management system and the feedback system via public networks. It will be appreciated that based on the required implementation, any suitable communication network may be utilized to allow communication between the systems in environment 100.

As described in detail below, the CI management system 106 manage builds. Specifically, on a high level, the CI management system 106 detects whether source code in a repository 112 that is registered for continuous integration is updated, retrieves a build configuration file from the repository 112, initializes one or more containers to retrieve source code from the repository 112 and test the updated source code based on the build configuration. The CI management system 106 also retrieves test results from the initialized containers, provides the test results to the feedback system 108, and releases the containers once the test is complete.

To test the source code, the CI management system 106 utilizes one or more computing resources. In some embodiments, the CI management system 106 communicates with a container management system (such as Amazon Web Services EC2 Container Services, Kubernetes, etc.) 116 to provision one or more computing resources to perform the build. Alternatively, the CI management system 106 utilizes dedicated on-premises computing resources (not shown) operatively connected to the CI management system 106.

A container management system 116 may be utilized when the CI management system 106 services a large number of clients or software development teams, constantly updating the source code they are working on. Physical on-premises devices may be utilized for lower volumes—i.e., when the CI management system 106 services a small number of clients or software development teams that update their source code infrequently.

In this disclosure, the CI management system 106 is described in association with a container management system 116. However, it will be appreciated that the various feature and techniques described herein could, with appropriate modifications, be used with physical on-premises devices without departing from the scope of the present disclosure.

The feedback system 108 receives notifications such as build updates and test results from the CI management system 106 and communicates/displays these notifications to developers and other interested parties, such as project managers, IT support, etc. The notifications may be communicated to the interested parties via any known communication means such as email, SMS, instant message. Alternatively, the notifications are made accessible on a web server, which the interested parties can access through web browsers on their client devices 102.

In FIG. 1 the SCM system 104, CI management system 106 and feedback system 108 have been depicted as separate systems communicating over one or more networks 110. These systems (or their functionality) may, however, be divided over any number of physical systems communicating in any appropriate manner. By way of example, the three systems could be hosted by a single physical computer system.

Build Process

Figure 2:
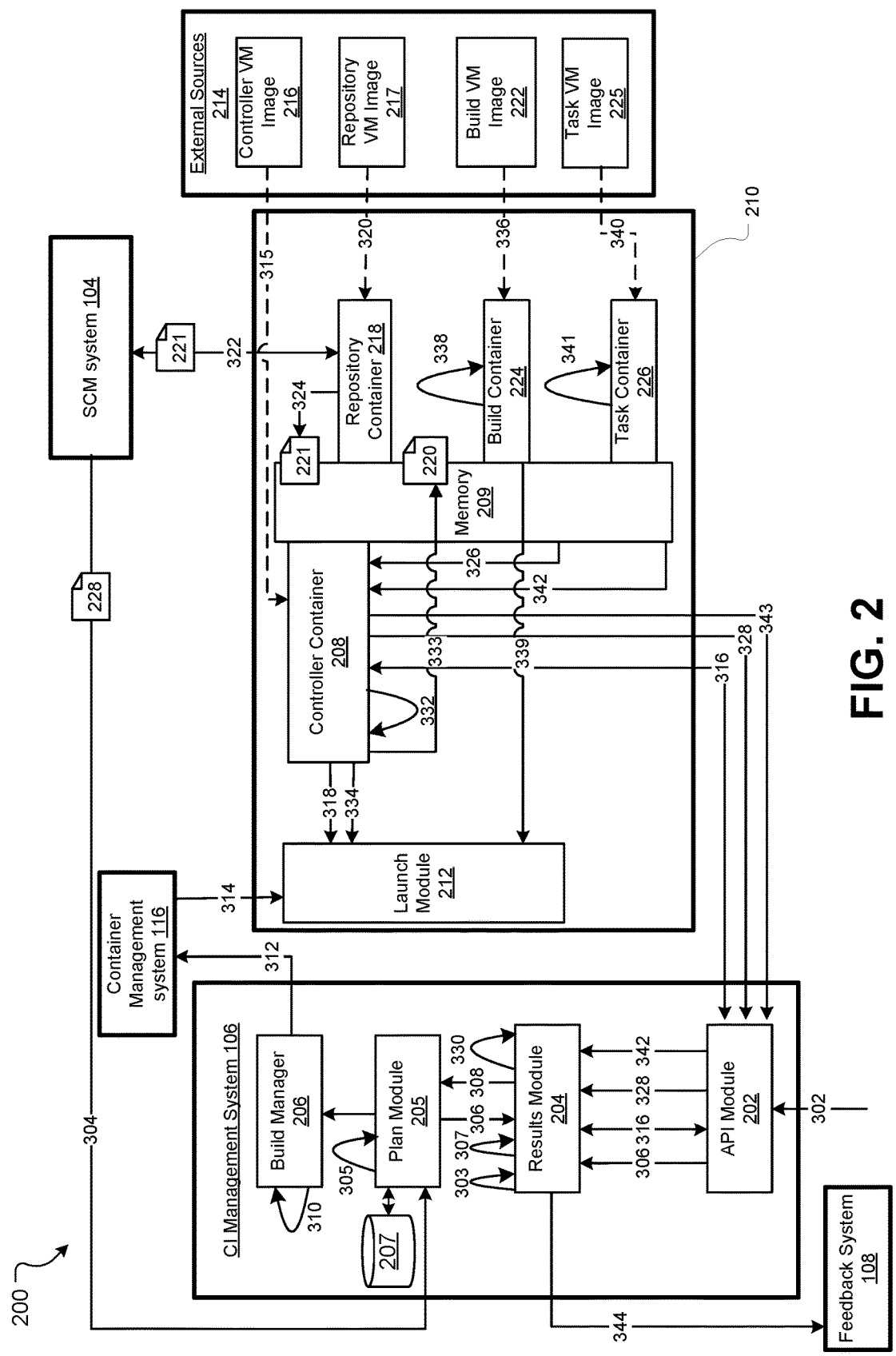
FIG. 2 is a block diagram 200 illustrating the manner in which a CI management system operates to control a given build according to some aspects of the present disclosure.

FIG. 2 is a block diagram 200 illustrating the manner in which the CI management system 106 operates to control a given build (i.e. a particular commit).

As shown in FIG. 2, the CI management System 106 of the present embodiment comprises an API module 202, a results module 204, a plan module 205, and a build manager 206. These modules may be software modules stored in the memory 360 of one or more the computing devices (such as computer system 350 described below), which are retrieved and executed by the processor 354 when required. Alternatively, the functional modules may be implemented in hardware.

The API module 202 is configured to communicate with external systems, i.e., forward or receive communication from external systems and forward these communications to one or more other modules of the CI management system 106. The results module 204 is configured to create a job descriptor, update the status of the job descriptor and communicate results of the build to the feedback system 108. The plan module 205 is configured to parse configuration files, and the build manager 206 is configured to schedule job descriptors, initiate and terminate build containers and receive results of builds from the build containers. The functions of each of these modules will be described in further detail in the following sections.

In addition to these modules, the CI management system 106 may also maintain a repository 207 for task definitions corresponding to each of the predefined tasks available to developers to add in their configuration files. For each predefined task, the repository 207 may store a unique identifier for the task, and a container image (e.g., Docker image) to be used for executing that particular task. If an image is not specified, a default image may be used. In addition, the repository 207 stores the script, i.e., the list of commands that are to be executed to perform the task, and/or a list of artifacts that may be produced by a particular task (e.g., reports, clean copies of the source code, and/or result files that are to be shared with the other tasks in the build configuration).

The CI management system 106 may initially interact with the container management system 116 to create a container group 210 for its builds. In AWS EC2 Container Services, this container group is called a cluster, whereas in Google Kubernetes it is referred to as a pod. Subsequently, when the CI management system 106 wishes to initiate a build, it may do so within the container group 210. In certain embodiments, the container group 210 may be on a hardware instance which also includes a launch module 212 (i.e., a program or set of instructions). The launch module 212 when executed retrieves VM images from local or external sources 214 and launches containers from the retrieved VM images in the container group 210. When the CI management system 106 is used to retrieve Docker images, the launch module 212 is referred to as a 'Docker daemon'. It will be appreciated that although the launch module 212 is shown as part of the container group 210 in FIG. 2, it is not logically a part of the container group 210, but on the same hardware instance as the container group 210.

To perform a particular build, the CI management system 106 initializes a number of containers and resources which operate together in the container group 210. In this particular example, three containers are initialized: a controller container 208, a repository container 218, and a build container 224. Further, for each task in a particular build configuration file, the build container can initialize a separate task container 226. A shared memory 209 is also mounted in the container group 210 which is accessible to all containers.

Also involved in a given build/test are the SCM system 104, the feedback system 108, and external sources 214.

For clarity, in FIG. 2 the functional modules, files, VM images, and containers are represented by reference numerals beginning with the number 2, whereas the method steps are represented by reference numerals beginning with the number 3.

The build process begins at step 302 where the CI management system 106 determines that a source code repository maintained by the SCM system 104 has been updated. In certain embodiments, the CI management system 106 polls the SCM system 104 at regular intervals (e.g., every 10 minutes) to identify repositories that have been updated in that interval. In other embodiments, the CI management system 106 automatically receives source code update notifications from the SCM system 104 when a repository is updated.

A notification, polled for or automatically received, may be communicated as an event descriptor to the API module 202. The event descriptor includes information about the repository where the change originated (e.g., a repository ID, a repository name, a repository type, and/or a repository URL), a list of the recent changes made to the repository, and the names of the authors and users that made the changes.

An example event descriptor is illustrated in Table A below. Although a table has been used to illustrate information received in the event descriptor, the relevant information need not be received in a table and could be received in any appropriate format (e.g. a simple text file, a JSON file, an XML file).

TABLE A

Example event descriptor

| | |
|---|---|
| Repository ID | 347kdsfjh38764 |
| Repository Name | John_Doe/bamboo-bootcamp |
| Repository URL | https://api.bitbucket.org/2.0/repositories/John Doe/bamboo-bootcamp |
| Author | John_Doe |
| Commit ID | 7a273a067efbf16ec83d885ad79a7a626f2eec3f |
| Changes | ``{``<br>    "forced": false,<br>    "old": {<br>      "links": {<br>        "commits": {<br>          "href": "https://api.bitbucket.org/2.0/repositories/Jdoe/demo2/commits/master"<br>        },<br>        "self": {<br>          "href":<br>"https://api.bitbucket.org/2.0/repositories/Jdoe/demo2/refs/branches/master"<br>        },<br>        "html": {<br>          "href": "https://bitbucket.org/Jdoe/demo2/branch/master"<br>        }<br>      },<br>      "type": "branch",<br>      "target": {<br>        "hash": "3c62dce565729e8dda3651557d86be6380a03445",<br>        "links": {<br>          "self": {<br>            "href":<br>"https://api.bitbucket.org/2.0/repositories/Jdoe/demo2/commit/3c62dce565729e8dda3651557d86be6380a03445"<br>          }, |

TABLE A-continued

Example event descriptor

```
        "html": {
            "href":
"https://bitbucket.org/Jdoe/demo2/commits/3c62dce565729e8dda3651557d86be6380a03445"
        }
    },
    "author": {
        "raw": "John Doe",
        "user": {
            "username": "Jdoe23",
            "type": "user",
            "uuid": "{39846whedwqh49873}",
        }
    }
},
```

In certain embodiments, the SCM system 104 communicates the notification via a webhook—a HTTP POST callback that creates and passes the event descriptor to the CI management system 106 when a corresponding repository is updated. For this to work, webhooks are created for the repositories 112 registered for CI.

Once an event descriptor that corresponds to a repository for which CI is required is received, the results module 204 creates an empty job descriptor at step 303, which includes, e.g., information about the repository that needs to be tested or built. This job descriptor can act as a placeholder which can be polled by the feedback system 108 to determine the status of the build. During the build process, the results module 204 constantly updates the status of the build in the job descriptor as the job proceeds from one step to the next.

The CI management system 106 (and in particular the plan module 205) then retrieves a build configuration file 228 for the repository at step 304. In certain embodiments, the build configuration file 228 may be stored in the SCM repository 112 along with the source code, whereas in other embodiments, the build configuration file 228 may be stored in the CI management system 106. Accordingly, depending on the particular embodiment, the CI management system 106 retrieves the build configuration file from the corresponding SCM repository 112 or from memory associated with the CI management system 106.

Generally speaking, the configuration file 228 corresponding to a particular repository 112 includes instructions for building, testing, and/or deploying source code revisions from that repository 112 in one or more environments. Further, in some cases, the configuration file may include different sets of testing/building instructions for different source code branches. For example, if a repository includes a master branch and a testing branch, the configuration file may include one set of instructions for testing/building source code revisions committed to the master branch and another set of instructions for testing/building source code revisions committed to the testing branch.

It will be appreciated that these are merely examples and that in some cases the configuration file may include a single set of instructions for building/testing source code revisions committed/pushed on any branch.

According to aspects of the present disclosure, a set of building/testing instructions may include the name of one or more repository branches for testing and steps for executing the build and/or testing for each branch. The steps may include identifiers of one or more predefined tasks selected by the developers to be performed for a particular step.

In addition, for each step, the configuration file may include a step name. Table B illustrates an example configuration file.

TABLE B

| configuration file | |
|---|---|
| Build configuration | Default |
| Step 1 | |
| Name: | Build |
| Script: | - zip application.zip * |
| | artifacts: |
| | - application.zip |
| Step 2 | |
| Name: | Deploy |
| Deployment: | Production |
| Script: | - Task: atlassian/aws-elasticbeanstalk-deploy:0.2.3 |
| | variables: |
| | AWS_ACCESS_KEY_ID: $AWS_ACCESS_KEY_ID |
| | AWS_SECRET_ACCESS_KEY: |
| | $AWS_SECRET_ACCESS_KEY |
| | AWS_DEFAULT_REGION: $AWS_REGION |
| | APPLICATION_NAME: $AWS_APPLICATION_NAME |
| | ENVIRONMENT_NAME: "my-eb-app-prod" |
| | ZIP_FILE: "application.zip" |

In the above example, the configuration file includes the following information:

A build configuration. In this example, the build configuration is 'default' which means that the steps for this configuration are executed for all commits (or source code revisions pushed to the SCM system 104) for that repository, unless the commit is for a particular branch or is manually selected. In other examples, the build configuration may point to a particular 'branch', in which case the steps are executed when a source code revision is committed to the defined branch. Alternatively, this field could be 'custom', in which case the steps are executed when a source code revision is manually selected for testing (e.g., via the web interface).

Steps, which define the commands executed and settings of containers in which the source code is to be built. Each step may further include the following fields:

Name, which defines what the step is doing. This field is usually displayed by the feedback system 108 and therefore is usually something that developers can easily understand.

Deployment: defines the type of environment for the deployment (e.g., testing, staging or production).

Script: this field contains a list of tasks that are to be executed to perform the build. For each task, the step field includes—
  A task identifier which uniquely identifies the task that is to be performed.
  A name: This defines what the task is meant to do. This field is also usually displayed by the feedback system 108 and therefore is usually something that developers can easily recognize.
  parameters: this field includes one or more run parameters which may be required to perform the task. For example, if the task is to deploy the source code in AWS, the run parameters may include information for accessing the AWS container such as AWS account details and the password for automatically accessing the developer's AWS account.

Although the configuration file is illustrated in a table, the relevant information need not be stored in a table and could be stored in any appropriate format (e.g. a text file such as YAML file).

To retrieve data, such as the configuration file 228 and source code, from the SCM repository, the CI management system 106 may negotiate permissions with the SCM system 104. For example, when a user first registers their repository for CI, the user authorizes the CI management system 106 to retrieve information such as source code and build description from the SCM repository without the need for explicit permissions when the CI management system 106 requires this information. This authorization may be done using any commonly known authorization/permissions techniques or standards, such as OAuth.

According to the OAuth standard, the CI enabled repositories 112 share secrets with the CI management system 106. Based on these secrets, the CI management system 106 generates authorization tokens when it performs a build for a repository. The tokens may be valid for the build duration and may expire once the build is complete.

Thus, using an authorization token, the CI management system 106 can access the SCM repository 112 identified in the event descriptor and retrieve the configuration file 228.

In some embodiments, the configuration file 228 is temporarily stored in the CI management system 106 to be utilized during the build. Once the build is completed, the configuration file may be discarded. Alternatively, it is stored in the CI management system 106 for future builds.

In certain embodiments, the API module 202 receives the configuration file 228 and passes the configuration file to the plan module 205. At step 305, the plan module 205 is configured to parse the configuration file, e.g., to determine whether the configuration file includes information required to execute a build (e.g., if the configuration file includes information about the VM image required for the build, the name of the source code branch, etc.). In certain embodiments, when parsing the configuration file 228, the plan module 205 is configured to determine if the configuration file includes any predefined tasks. For instance, the plan module 205 may inspect the script field of the configuration file 228 to determine whether any predefined task names are included. If the plan module 205 identifies one or more predefined tasks names, it is configured to look up the corresponding task definition in the task definition repository 207 and retrieve the task definition corresponding to that task. The plan module 205 can then insert the retrieved task definition into the parsed content of the configuration file. For example, it can insert the name of the container image (from the task definition) required to perform the task.

At step 306, the event descriptor and the parsed configuration file 228 are passed to the results module 204, which updates the status of the result generated at step 303 to 'pending'.

Next, at step 307, the results module 204 updates the job descriptor. In certain embodiments, fields of the job descriptor may be updated based on the event descriptor and the parsed content of the configuration file. Largely, the job descriptor includes an identifier that uniquely identifies the current job, access permissions for accessing a repository (i.e., the repository identified in the event descriptor), and a field indicating the build status (e.g., whether the build is pending, queued, in progress, successful, completed, failed, etc.). The job descriptor may further include a repository identifier, and a field indicating the build steps that are to be performed during the build. In addition, a revision field may be included that indicates the source code version being tested.

Table C illustrates an example job descriptor below. Although a table has been used to illustrate information stored in the job descriptor, the relevant information need not be stored in a table and could be stored in any appropriate format (e.g. a simple text file, a JSON file, an XML file, etc.).

TABLE C

| Job Descriptor | |
|---|---|
| Job descriptor ID | 8374erjewlkfjdslk3874 |
| Auth-token | fd4jw4908343943 |
| Status | Pending |
| Repository ID | 347kdsfh38764 |
| Revision | 5 |
| Build Steps | { "size": 1, "environment": { "type"; "deployment_environment", "uuid": "{21c4b279-d557-4912-966b-044d72eal156}", "name": "production" }, "resource_limits": { "memory_limit_in_megabytes": 3072 "testReportDefinition": { "target_directories": [ "test-reports", "surefire-reports", "failsafe-reports", "test-results" ], "ignored_directories": [ ".git" ], "search_depth": 4 }, "test_report": { "definition": { "target_directories": [ "test-reports", "surefire-reports", "failsafe-reports", "test-results" ], "ignored directories : [ ".git" ], "search_depth": 4 } }, "services": [ "uuid": "{82aa241b-183b-4688-99e4-d48e9c979060}", "origin": "SYSTEM", "name": "docker", |

TABLE C-continued

| Job Descriptor |
|---|
| ```
"image": {
"name": "atlassian/pipelines-docker-daemon:prod-stable"
},
"resource_limits": {
"memory_limit_in_megabytes": 1024
}
},
{
"uuid": "{602bcc35-5649-4fff-8ad1-4dbf58987315}",
"origin": "SYSTEM",
"name": "auth-proxy",
"image": {
"name": "atlassian/pipelines-auth-proxy:prod"
},
"resource_limits": {
"memory_limit_in_megabytes": 1024
}
}
],
"log_byte_count": 6296,
"imports_artifacts_from_steps": [
"{6ae8b042-3d25-4e40-8c9c-3e5b984d9cb7}"
],
"tasks": {
"execution_phases": {
"SETUP": [
{
"environment": [ ],
"commands": [
{
"command_string": "umask 000",
"execution_duration": "PT0.7435327S"
},
{
"command_string": "GIT_LFS_SKIP_SMUDGE=1 git clone
-branch=\"master\"--depth 50 https://x-token-
auth:{access_token}@bitbucket.org/svaccarella/my-eb-
app.git$BUILD_DIR",
"execution_duration": "PT0.5238454S"
},
{
"command_string": "git reset --hard
a62073350a9d51175ef2831ed0391d7bc1593e79",
"execution_duration": "PT0.0016613S"
},
{
"command_string": "git con ig user.name bitbucket-pipe-
lines",
"execution_duration": "PT0.0008914S"
},
{
"command_string": "git config user.email commits-
noreply@bitbucket.org",
"execution_duration": "PT0.0008366S"
},
{
"command_string": "git config push.default current",
"execution_duration": "PT0.0008998S"
},
{
"command_string": "git config
http.${BITBUCKET_GIT_HTTP_ORIGIN}.proxy
http://localhost:29418/",
"execution_duration": "PT0.000941S"
},
{
"command_string": "git remote set-url
origin http://bitbucket.org/svaccarella/my-eb-app",
"execution_duration": "PT0.0009202S"
},
{
"command_string": "chmod 777 $BU1LD_DIR",
"execution_duration": "PT2.7412706S"
}
],
``` |

TABLE C-continued

| Job Descriptor |
|---|
| ```
*log_range": {
"first_byte_position": 0,
"byte_count": 860,
"last_byte_position": 859
}
}
],
"MAIN": [
{
"key": "atlassian/aws-elasticbeanstalk-deploy:0.2.3",
"image": {
"name": "bitbucketpipelines/aws-elasticbeanstalk-deploy:
0.2.3"
},
"environment": [
{
"key": "APPLICATION_NAME",
"value": "$AWS_APPLICATION_NAME"
},
{
"key": "AWS_ACCESS_KEY_ID",
"value": "$AWS_ACCESS_KEY_ID"
},
{
"key": "AWS_DEFAULT_REGION",
"value": "$AWS_REGION"
},
{
"key": "AWS_SECRET_ACCESS_KEY",
"value": "$AWS_SECRET_ACCESS_KEY"
},
{
"key": "ENVIRONMENT_NAME",
"value": "my-eb-app-prod"
},
{
"key": "ZIP_FILE",
"value": "application.zip"
}
],
"commands": [
{
"command_string": "pipe: atlassian/aws-elasticbeanstalk-
deploy:0.2.3",
"execution_duration": "PT6.5906122S"
}
],
"log_range": {
"first_byte_position": 860,
"byte_count": 5159,
"last_byte_position": 6018
}
}
],
"TEARDOWN": [
{
"environment": [ ],
"commands": [
{
"command_string""PROCESS_TEST_REPORTS",
"execution_duration": "PT0.006S"
}
],
"log_range": {
"first_byte_position": 6019,
"byte_count": 277,
"last_byte_position": 6295
}
}
]
}
},
"feature_flags": [
{
"name":"agent.concurrent.artifact.download",
"value": true
},
``` |

TABLE C-continued

Job Descriptor

```
{
"name": "agent.concurrent.file.download",
"value": true
},
{
"name": "agent.download.max.part.size.bytes",
"value": 4194304
},
{
"name": "agent.max.concurrent.downloads",
"value": 20
},
{
"name": "capture.git-log.failed.reset",
"value": false
},
{
"name": "cpu.limit",
"value": 4000
},
{
"name": "detailed.logging",
"value": false
},
{
"name": "four.x.size.enabled",
"value": false
},
{
"name": "pipe.data.artifact.enabled",
"value": false
},
{
"name": "plan.service.new.parser.enabled",
"value": true
},
{
"name": "plan.service.old.parser.disabled",
"value": false
},
{
"name": "runtime3",
"value": false
}
],
"uuid": "{47ccf530-4cae-4a06-a696-305ee5cdef22}",
"name": "Deploy",
"trigger": {
"type": "pipeline_step_trigger_automatic"
},
"state": {
"name": "COMPLETED",
"type": "pipeline_step_state_completed",
"result": {
"name": "SUCCESSFUL",
"type": "pipeline_step_state_completed_successful"
}
},
"image": {
"name": "atlassian/default-image:2"
},
"maxTime": 120,
"started_on": "2019-02-26T04:39:52.203Z",
"completed_on": "2019-02-26T04:40:08.658Z",
"duration_in_seconds": 16,
"build_seconds_used": 16,
"run_number": 1
}
```

The results module 204 may retrieve some of the required information, such as the repository ID from the event descriptor and the build steps from the task definitions for the tasks included in the configuration file. Other information (such as the job descriptor identifier and the authorization token) may be generated by the results module 204. Once a job descriptor is created, it is queued.

At step 308, the results module 204 notifies the build manager 206 that a new job is ready. In one embodiment, the build manager 206 is notified of jobs using a publish-subscribe messaging pattern. In this case, the CI management system 106 characterizes the job descriptors added by the results module 204 under a specific topic such as 'pending jobs' and the build manager 206 subscribes to this particular topic and therefore receives a message when the 'pending jobs' topic is updated. In alternate embodiments, the build manager 206 is notified of the jobs using any known communication technique such as direct messaging.

The build manager 206 retrieves queued job descriptors in a particular predetermined order. For example, it may retrieve and initiate job descriptors based on the order in which they were queued (e.g., first-in-first-out or first-in-last-out). Alternatively, the job descriptors may be consumed in order of priority.

In any case, the build manager 206 retrieves a queued job descriptor and creates a job definition at step 310, which is used to launch a controller container 208 (hereafter referred to as controller 208).

A job definition is usually required to run container(s) in a container management system 116, such as AWS EC2 Container Service. The job definition typically specifies the VM image(s) to be used for the task, the CPU and memory required for the container, whether any port mappings (that allow the container to have external connectivity) are required, memory that can be accessed by other containers, and environment variables that can be passed to the container for its use. Furthermore, the job definition may include information for mounting one or more non-ephemeral memory volumes for storing data or software that may be used by the container being initiated.

For controller 208, the build manager 206 may generate a job definition that includes:
 a. name and/or identifier of the VM image to be retrieved and used for the controller,
 b. location of the controller VM image (e.g., locally cached on the CI management system or available at an external source),
 c. the CPU and memory required for the controller instance,
 d. the networking mode, such as a 'bridge' networking mode or a 'host' networking mode that allows the controller to have external connectivity,
 e. volume information for retrieving and storing data or software that is used the controller container to perform its functions,
 f. a memory identifier identifying a memory mount that can be shared between multiple containers, and
 g. environment variables that are passed to the controller container once it is launched.

The environment variables may include CI system defined and/or user defined variables, such as, for example, a job descriptor identifier, permission information (e.g., an authorization token for accessing the repository 112 and an authorization token for communicating with the CI management system 106), a location identifier for the build description, and any other user-specified run parameters such as usernames and passwords to access the user's services/accounts on external systems (which were passed e.g., via the configuration file 228), etc.

Table D illustrates an example job definition for the controller container 208. It will be appreciated that this is merely an example and that in other embodiments different fields or field values may be utilized without departing from the scope of the present disclosure. Although a table has been used to illustrate information stored in the job definition, the relevant information need not be stored in a table and could be stored in any appropriate format (e.g. a simple text file, a JSON file, an XML file, etc.).

TABLE D

Example job definition for the controller container

| | |
|---|---|
| Job definition ID | aws:ecs:us-west-1:38734:task-definition/controller-prod-west:34 |
| Network mode | Bridge |
| Volume Memory | 4096 |
| Volume Essential | True |
| Volumes Mount Points | {<br>"containerPath": "/tmp",<br>   "sourceVolume": "temporaryDirectoiy",<br>   "readOnly": null<br>},<br>{<br>   "containerPath": "/usr/lib/37845/libltdl.so.7",<br>   "sourceVolume": "libltdl",<br>   "readOnly": null<br>},<br>{<br>   "containerPath": "Nar/run/docker.sock",<br>   "sourceVolume": "dockerSocket",<br>   "readOnly": null<br>},<br>{<br>   "containerPath": "/var/run/docker.sock",<br>   "sourceVolume": "dockerExecutable",<br>   "readOnly": null} |
| Container Name: | Controller |
| Container Environment Variables | CommitID=4387498723987qwhdsjkhdajshe324632786<br>Repository Slug=Whack<br>Repository Owner=JDoe<br>Branch =master<br>URI=Base URL to the CI system<br>Account ID=d790be83-c700-49cd-b9d7-05a55c6c69d0<br>Repository ID=a43eb225-4b7a-4224-bffc-c2afe974229e<br>Controller ID=3fc77424-eee1-4cd9-bc01-4e036922947b<br>Controller step ID=3656fIbf-49a2-41f9-98ab-65c2d28a2b45<br>Controller Access=$CIS_Oauth_Access_Token (To communicate with the CI management system)<br>Repository Access = $Repo_Oauth_Access_Token (to check out the source code from the SCM system)<br>Controller setup image=$Setup_Image (Controller image with controller software on it) |
| VM image link | [ ] |
| VM Image | Controller:latest |
| Container CPU | 0 |
| Container Memory reservation | Null |
| Container Volumes | "host": {<br>   "sourcePath":"/tmp"<br>},<br>"name":"temporaryDirectory"<br>},<br>{<br>"host": {<br>   "sourcePath": "/usr/lib/37845/libltdl.so.7"<br>},<br>"name": "libltd1"<br>},<br>{<br>"host": {<br>   "sourcePath": "/var/run/docker.sock"<br>},<br>"name": "dockerSocket"<br>},<br>{<br>"host": {<br>   "sourcePath": "/usr/bin/docker"<br>},<br>"name": "dockerExecutable"<br>}<br>] |

The example job definition includes a number of volumes (i.e., memory) for storing/retrieving data such as libraries, programs and application required during the build. The example illustrates a socket volume and an executable volume. The socket volume includes a file that allows the controller container 208 to request the launch module 212 to initiate other containers (such as the repository container 218, the build container 224, and one or more task containers 226). The container executable volume stores software (i.e., executable instructions) that when executed allows the container to run a container application (e.g., Docker).

In addition to creating the job definition, in some embodiments, the build manager 206 also maintains a record of the job definition and the corresponding job descriptor in a data structure at this step. Once the job is completed, i.e., the build is complete, the build manager 206 may remove the job definition and the corresponding job descriptor from the data structure. This data structure (not shown) may be maintained to keep a record of the job definitions that were used to perform jobs and may be queried at a later stage if required.

At step 312, the build manager 206 passes the created job definition to the container management system 116 over communication network 110.

At step 314, the container management system 116 provides the job definition to the launch module 212 and instructs it to retrieve the controller VM image 216 corresponding to the VM image specified in the job definition.

The launch module 212 inspects the location of the VM image and retrieves the controller VM image 216 from that location. It will be appreciated that the VM image may be retrieved from an external source such as an externally hosted repository of VM images (e.g., Docker hub) or it may be retrieved from a local cache. In certain embodiments, the VM image may be retrieved from an external source in a first instance and then stored locally for future use. At 315, the launch module 212 causes the controller VM image 216 to be executed based on the parameters in the job definition to start the controller container 208.

A shared memory 209 (based on the memory parameters defined in the job definition) is also mounted in the container group 210 at this stage. The controller 208 controls access to this memory. For example, the controller 208 may grant read, write, and/or modify permissions to other containers in the container group 210.

At step 316, the controller 208 retrieves details of the build it has to perform from the results module 204. To that end, the controller 208 passes one or more environment variables (i.e., the job descriptor identifier and the authorization token for accessing the CI management system 106 that were passed to the controller 208 via the job definition) to the results module 204, requesting the results module 204 to provide the corresponding job descriptor and parsed build configuration file. In the present embodiment, this request is made via the CI management system API module 202.

In certain embodiments, the results module 204 passes the corresponding job descriptor and the parsed build configuration file to the controller 208. Before passing the build configuration file, however, the result module 204 may first determine whether the controller 208 is authorized to access this information by comparing the authorization token provided by the controller 208 with a corresponding authorization token maintained by the CI management system 106, for example.

At step 318, the controller 208 requests the launch module 212 to retrieve a repository container 218. The controller 208 may select an appropriate repository container 218 based on the repository type (identified from the job descriptor or build configuration file). For example, if the source code repository is a GIT repository, the controller 208 requests the launch module 212 to retrieve and launch a GIT repository container. Alternatively, if the source code repository is another type of repository, such as a MERCURIAL repository, the controller 208 requests the launch module 212 to retrieve and launch a MERCURIAL repository container.

To launch the repository container 218, the controller 208 may create and forward to the launch module 212 a job definition similar to the job definition created by the build manager 206 at step 310. The job definition may include the name and URL for a repository VM image 217, the CPU and memory required for the container, and port mappings (that allow the container to communicate with the SCM system 104). Other fields of the job definition may include an identifier/permissions for the memory 209, and environment variables (including, for example, the repository ID, the source code branch, and an authorization token to access the SCM repository 112). In certain embodiments, these environment variables are provided by the build manager 206 to the controller container 208 and subsequently passed from the controller container 208 to the repository container 218 via the job definition for the repository container 218.

The launch module 212 inspects the VM image URL and retrieves the repository VM image 217 from the URL specified in the job definition. At step 320, the launch module 212 causes the repository VM image 217 to be executed based on the parameters defined in the job definition to start repository container 218. The repository container thus launched is allowed to access the SCM repository 112, has write access to the shared memory 209, and possesses the environment variables defined in the corresponding job definition.

Next, at step 322, the repository container 218 communicates with the SCM system 104 to retrieve source code 221 from an SCM repository 112. To that end, the repository container 218 may pass the authorization token received in the previous step to the SCM system 104. The SCM system 104 inspects this authorization token to determine whether the repository container 218 is allowed access to the SCM repository 112. If permission is granted, the SCM system 104 retrieves the latest updated source code 221 from the SCM repository 112 and forwards it to the repository container 218.

At step 324, the repository container 218 stores the source code 221 in the shared memory 209.

At step 326, the controller 208 is informed that source code 221 is added to the memory 209 via for example a return code (such as 0 for successfully retrieving source code). Subsequently, at step 328, the controller 208 informs the results module 204 that the build process is 'in progress'. This update is passed to the results module 204 via the API module 202. The results module 204 in turn updates the build status in the job descriptor at step 330. In one example, the build status may be updated from 'pending' to 'in progress.'

At step 332, the controller 208 creates a build script 220 from the parsed build configuration description received at step 316; and at step 333, it stores the build script 220 in the shared memory 209. Typically, the build configuration file is stored in the SCM repository 112 in a non-executable file, such as a YAML file. When the CI management system 106 retrieves the build configuration file at step 304 and adds the build commands from the build configuration file to the job descriptor, the build commands may be converted from YAML into JSON. However, the build commands are still in a non-executable format.

In one embodiment, the controller 208 extracts the build commands from the build configuration file 228 received in step 316 and converts the extracted build commands into an executable file, such as a shell script. In one embodiment, this could be a BASH script. This executable file is called the build script 220. Any known techniques may be utilized to generate the build script 220 and these are not described here in detail.

Table E illustrates an example build script that is generated based on the build commands extracted from the build configuration file shown in Table B.

TABLE E

Example Build Script

```
#!/bin/bash
set -e
set +H
printf "\x 1d+ docker container run \x5c
--volume=/opt/atlassian/pipelines/agent/build:/opt/atlassian/pipelines/agent/build \x5c
--volume=/opt/atlassian/pipelines/agent/ssh:/opt/atlassian/pipelines/agent/ssh:ro \x5c
--volume=/usr/local/bin/docker:/usr/local/bin/docker:ro \x5c
--
volume=/opt/atlassian/pipelines/agent/build/.bitbucket/pipelines/generated/pipelines/pipes:/opt/
atlassian/pipelines/agent/build/.bitbucket/pipelines/generated/pipeline/pipes \x5c
--
volume=/opt/atlassian/pipelines/agent/build/.bitbucket/pipelines/generated/pipeline/pipes/
atlassian/aws-elasticbeanstalk-
deploy:/opt/atlassian/pipelines/agent/build/.bitbucket/pipelines/generated/pipeline/pipes/
atlassian/aws-elasticbeanstalk-deploy \x5c
--workdir=\x24(pwd) \x5c
--label=org.bitbucket.pipelines.system=true \x5c
--env=CI=\x22\x24CI\x22 \x5c
--env=BITBUCKET_COMMIT=\x22\x24BITBUCKET_COMMIT\x22 \x5c
--env=BITBUCKET_BUILD_NUMBER=\x22\x24BITBUCKET_BUILD_NUMBER\x22 \x5c
--env=BITBUCKET_BRANCH=\x22\x24BITBUCKET_BRANCH\22 \x5c
--
env=BITBUCKET_PR_DESTINATION_BRANCH=\x22\x24
BITBUCKET_PR_DESTINATION BRANCH\x22 \x5c
--
env=BITBUCKET_PR_DESTINATION_COMMIT=\x22\x24
BITBUCKET_PR_DESTINATION_COMMIT\x22 \x5c
```

TABLE E-continued

Example Build Script

```
--env=BITBUCKET_PR_ID=\x22\x24BITBUCKET_PR_ID\x22 \x5c
--env=BITBUCKET_TAG=\x22\x24BITBUCKET_TAG\x22 \x5c
--env=BITBUCKET_BOOKMARK=\x22\x24BITBUCKET_BOOKMARK\22 \x5c
--env=BITBUCKET_REPO_OWNER=\x22\x24BITBUCKET_REPO_OWNER\x22 \x5c
--
env=BITBUCKET_REPO_OWNER_UUID=\x22\x24BITBUCKET_REPO_OWNER_UUID\
x22 \x5c
--env=BITBUCKET_REPO_SLUG=\x22\x24BITBUCKET_REPO_SLUG\x22 \x5c
--env=BITBUCKET_REPO_UUID=\x22\x24BITBUCKET_REPO_UUID\x22 \x5c
--env=BITBUCKET_CLONE_DIR=\x22\x24BITBUCKET_CLONE_DIR\x22 \x5c
--env=BITBUCKET_PARALLEL_STEP=\x22\x24BITBUCKET_PARALLEL_STEP\x22 \x5c
--
env=BITBUCKET_PARALLEL_STEP_COUNT=\x22\x24
BITBUCKET_PARALLEL_STEP_COUNT\x22 \x5c
--env=BITBUCKET_GIT_HTTP_ORIGIN=\x22\x24BITBUCKET_GIT_HTTP_ORIGIN\x22
\x5c
env=BITBUCKET_GIT_SSH_ORIGIN=\x22\x24BITBUCKET_GIT_SSH_ORIGIN\x22 \x5c
--env=PIPELINES_JWT_TOKEN=\x22\x24PIPELINES_JWT_TOKEN\x22 \x5c
--
env=BITBUCKET_DOCKER_HOST_INTERNAL=\x22\x24
BITBUCKET_DOCKER_HOST_INTERNAL\x22 \x5c
--env=DOCKER_HOST=\x22tcp://host.docker.internal:2375\x22 \x5c
--
env=BITBUCKET_PIPE_SHARED_STORAGE_DIR=\x22/opt/atlassian/pipelines/agent/
build/.bitbucket/pipelines/generated/pipeline/pipes\x22 \x5c
--
env=BITBUCKET_PIPE_STORAGE_DIR=\x22/opt/atlassian/pipelines/agent/build/.bitbucket/
pipelines/generated/pipeline/pipes/atlassian/aws-elasticbeanstalk-deploy\x22 \x5c
--env=APPLICATION_NAME=\x22\x24AWS_APPLICATION_NAME\x22 \x5c
--env=AWS_ACCESS_KEY_ID=\x22\x24AWS_ACCESS_KEY_ID\x22 \x5c
--env=AWS_DEFAULT_REGION=\x22\x24AWS_REGION\x22 \x5c
--env=AWS_SECRET_ACCESS_KEY=\x22\x24AWS_SECRET_ACCESS_KEY\x22 \x5c
--env=ENVIRONMENT_NAME-\x22my-eb-app-prod\x22 \x5c
--env=ZIP_FILE=\x22application.zip\x22 \x5c
--add.host\x22host.docker.internal:\x24BITBUCKET_DOCKER_HOST_INTERNAL\x22
\x5c
bitbucketpipelines/aws-elasticbeanstalk-deploy:0.2.3\n"
docker container run \
--volume=/opt/atlassian/pipelines/agent/build:/opt/atlassian/pipelines/agent/build \
--volume=/opt/atlassian/pipelines/agent/ssh:/opt/atlassian/pipelines/agent/ssh:ro \
--volume=/usr/local/bin/docker:/usr/local/bin/docker:ro \
--
volume=/opt/atlassian/pipelines/agent/build/.bitbucket/pipelines/generated/pipeline/pipes:/opt/
atlassian/pipelines/agent/build/.bitbuicket/pipelines/generated/pipelines/pipes \
--
volumes/opt/atlassian/pipelines/agent/build/.bitbucket/pipelines/generated/pipeline/pipes/
atlassian/aws-elasticheanstalk-
deploy:/opt/atlassian/pipelines/agent/build/.bitbucket/pipelines/generated/pipelines/pipes/
atlassian/aws-elastiebeanstalk-deploy \
--workdir=$(pwd) \
--label=org.bitbucket.pipelines.system=true \
--env=CI="$CI" \
--env=BITBUCKET_COMMIT="$BITBUCKET_COMMIT" \
--env=BITBUCKET_BUILD_NUMBER="$BITBUCKET_BUILD_NUMBER" \
--env=BITBUCKET_BRANCH="$BITBUCKET_BRANCH" \
env=BITBUCKET_PR_DESTINATION_BRANCH="$BITBUCKET_PR_DESTINATION_BRANCH" \
--
env=BITBUCKET_PR_DESTINATION_COMMIT="$BITBUCKET_PR_DESTINATION_COMMIT"\
--env=BITBUCKET_PR_ID="$BITBUCKET_PR_ID" \
--env=BITBUCKET_TAG="$BITBUCKET_TAG" \
--env=BITBUCKET_BOOKMARK="$BITBUCKET_BOOKMARK" \
--env=BITBUCKET_REPO_OWNER="$BITBUCKET_REPO_OWNER" \
--env=BITBUCKET_REPO_OWNER_UUID="$BITBUCKET_REPO_OWNER_UUID" \
--env=BITBUCKET_REPO_SLUG="$BITBUCKET_REPO_SLUG" \
--env=BITBUCKET_REPO_UUID="$BITBUCKET_REPO_UUID" \
--env=BITBUCKET_CLONE_DIR="$BITBUCKET_CLONE_DIR" \
--env=BITBUCKET_PARALLEL_STEP="$BITBUCKET_PARALLEL_STEP" \
--
env=BITBUCKET_PARALLEL_STEP_COUNT="$BITBUCKET_PARALLEL_STEP_COUNT" \

--env=BITBUCKET_GIT_HTTP_ORIGIN="$BITBUCKET_GIT_HTTP_ORIGIN" \
--env=BITBUCKET_GIT_SSH_ORIGIN="$BITBUCKET_GIT_SSH_ORIGIN" \
--env=PIPELINES_JWT_TOKEN="$PIPELINES_JWT_TOKEN" \
```

TABLE E-continued

Example Build Script

```
--env=BITBUCKET_DOCKER_HOST_INTERNAL="$BITBUCKET_DOCKER_HOST_INTERNAL" \
--env=DOCKER_HOST="tcp://host.docker.internal:2375" \
--
env=BITBUCKET_PIPE_SHARED_STORAGE_DIR="/opt/atlassian/pipelines/agent/build/.
bitbucket/pipelines/generated/pipeline/pipes" \
--
env=BITBUCKET_PIPE_STORAGE_DIR="/opt/atlassian/pipelines/agent/build/.bitbucket/pipelines/
generated/pipeline/pipes/atlassian/aws-elasticbeanstalk-deploy" \
--env=APPLICATION_NAME="$AWS_APPLICATION_NAME" \
--env=AWS_ACCESS_KEY_ID="$AWS_ACCESS_KEY_ID" \
--env=AWS_DEFAULT_REGION="$AWS_REGION" \
--env=AWS_SECRET_ACCESS_KEY="$AWS_SECRET_ACCESS_KEY" \
--env=ENVIRONMENT_NAME="my-eb-app-prod" \
--env=ZIP_FILE="application.zip" \
--add-host="host.docker.internal:$BITBUCKET_DOCKER_HOST_INTERNAL" \
bitbucketpipelines/aws-elasticbeanstalk-deploy:0.2.3
```

Once the build script 220 is stored in the shared memory 209, the method proceeds to step 334 where the controller 208 requests the launch module 212 to retrieve a build VM image 222. To that end, the controller 208 creates and provides a job definition for a build container 224 to the launch module 212. The job definition may include the name and URL for the build VM image 222 (retrieved from the build description), the CPU and memory required for the build container, and an identifier of the memory 209 shared by the controller 208.

At step 336, the launch module 212 retrieves the build VM image 222 based on the VM image URL in the job definition. The build VM image 222 may be available at an external public source, such as Docker Hub, or it may be available at an external private source, such as user's personal website. Alternatively, the build VM image 222 may be stored locally in the CI management system 106. In any case, the launch module 212 retrieves the VM image 222 from the URL address and launches a build container 224 from the image based on the job definition at step 336.

Next, at step 338 the build container 224 retrieves the source code 221 and the build script 220 from the shared memory 209 and executes the build script 220 on the source code 221. In one embodiment, the build container 224 writes the test results and errors in a file and this file may be stored back in the shared memory 209.

While executing the build script 220, the build container 224 determines whether the build script includes any tasks. If a task exists, at step 339 the build container 224 is configured to retrieve the task script for the task from the task definition repository (e.g., based on the task identifier in the build script). The build container then packages the build logic associated with that task (including the VM image, the build commands, the run parameters, and any other associated information) along with the task script into a task job description and request the launch module 212 to retrieve a VM image 225 specified for that particular task e.g., by forwarding the task job description for a task container 226 to the launch module 212. In the present example, the task may require a particular VM image that is different from the VM image used to create the build container 224. However, it will be appreciated that in other embodiments, the same VM image as that used for the build container 224 may be utilized to initiate the task container 226. The job description may include the name and URL for the build VM image (retrieved from the parsed build configuration file), the CPU and memory required for the task container, and an identifier of the memory 209 shared by the controller 208.

At step 340, the launch module 212 retrieves the task VM image 225 based on the VM image URL in the job definition. The task VM image 225 may be available at an external public source, such as Docker Hub, or it may be available at an external private source, such as user's personal website. Alternatively, the task VM image 225 may be stored locally in the CI management system 106. In any case, the launch module 212 retrieves the task VM image 225 and launches a task container 226 from the image based on the job definition at step 336.

Next, at step 341 the task container 226 compiles the task script, retrieves the source code 221 and executes the complied task script on the source code 221. In one embodiment, the task container 226 writes the test results and errors in a file and this file may be stored back in the shared memory 209.

At step 342, the controller 208 receives the test results from the memory 209 and passes them to the results module 204 at step 343, via the API module 202. It will be appreciated that a build configuration may include multiple tasks and the build container 224 may be configured to initiate multiple task containers (one for each task) based on the build script 220. Each task container 226 may generate its own test results and store these in the shared memory 209. Accordingly, method steps 339-343 may be repeated for teach task in the build configuration.

In addition to generating the job descriptor for queuing a job, the result module 204 utilizes the job descriptor to provide build updates to the feedback system 108. Specifically, the results module 204 provides the job descriptor as a placeholder to the feedback system 108. Users may poll this placeholder from time to time to check the build status.

The results module 204 also updates the build status in the job descriptor based on updates it receives during the build process 300. For example, when the job descriptor is queued, the results module 204 may update the build status from 'pending' to 'queued' in the job descriptor. Similarly, when the controller 208 communicates with the results module at step 316, the results module 204 may update the build status from 'queued' to 'in progress'. Finally, when the build is completed, and the results module 204 receives the results from the controller 208 in step 342, the results module 204 may update the build status from 'in progress' to 'completed', 'successful', or 'failed' depending on the result of the build. It also passes the results of the build received from the controller 208 to the feedback system 108.

In certain embodiments, the results module 204 may not retrieve the build configuration file 228 for the repository at step 304. In these cases, the repository container 218 may retrieve the build configuration file 228 from the SCM system 104 at step 322 and store the build configuration file 228 along with the source code 221 in the shared memory 209 at step 324. The controller 208 may thereafter retrieve the build configuration file 228 from the shared memory 209, parse it to create the build script 220 and store the build script 220 in the shared memory 209 in step 333.

In some embodiments, method described with reference to FIG. 2 may be used to verify source code in different branches of a repository. To that end, a developer may define the same or different VM images for each branch and different or the same build steps for each branch in the build description. At steps 322 and 324, the repository container 218 may then retrieve source code from the specified branches and store the source code as different files in the memory 209. Similarly, at step 332 the controller 208 may build different build scripts corresponding to the different branches (if different build steps were defined for each branch) and store these build scripts in the memory 209. The build container 224 may subsequently retrieve source code files 221 and corresponding build scripts 220 from the memory 209 and perform the builds sequentially.

The method described with reference to FIG. 2 can be used to perform builds on multiple build containers 224. In that case, the build description may include identifiers for multiple VM images 222, and the launch module 212 may retrieve the specified build VM images 222 at steps 334 and 326. Thereafter, method steps 338-342 may be repeated for each build container 224 either simultaneously or sequentially.

In the embodiment described with reference to FIG. 2, the build manager 206 provides instructions to launch the controller container 208, and thereafter the controller 208 provides instructions to launch the repository 218 and build 224 containers. In an alternate embodiment, the build manager 206 may provide instructions, in the form of a pod specification for example, to the container management system 116 (e.g., Google Kubernetes) to retrieve and launch all three containers (i.e., the controller, repository and build instances) in a pod 210.

The instructions include information for launching each container. The container specific information may include the container name, the VM image for the container, run parameters for the container, and resources (e.g., CPU and memory) required by the container. The instructions may also include information about one or more volumes (such as the shared memory 209) that can be mounted by the containers belonging to the pod 210.

Based on the instructions provided by the build manager 206, the container management system 116 subsequently retrieves the VM images for the specified containers (e.g., the controller, repository, and build containers 208, 218, and 224) either from local cache memory or from external sources 214 specified in the instructions. It also mounts the shared memory 209 based on the instructions at this stage.

The build manager 206 may subsequently issue a 'start' or 'run' command, requesting the pod 210 to begin the build process.

The controller and repository containers 208, 218 within the pod 210 subsequently perform their functions (i.e., retrieve the build script 220 and the source code 221 and store them in the shared memory 209). Once the build script 220 and the source code 221 are stored in the shared memory 209, the build container 224 is instructed to begin its operation (i.e., retrieve the source code 221 and the build steps 220 and perform the build).

Furthermore, in certain embodiments, instead of launching a repository container 218, the controller container 208 may be configured to perform the functions of the controller container 208 and the repository container 218. Specifically, the controller 208 may be configured to retrieve build instructions and source code 221 and store both in the shared memory 209. The controller instance may also retrieve build/test results from the build container 224 and pass them on to the results module 204, via the API module 202.

Hardware Overview

The operations/techniques described herein are implemented by one or more special-purpose computing systems or devices. For example, in environment 100: SCM system 104 may be provided by a computer system; the client devices 102 are computer systems; the CI management system 106 is provided by one or more computer systems; the feedback system 108 is provided by one or more distributed computing systems, and the computing resources on the cloud computing platform are also provided by one or more computer systems.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 3:
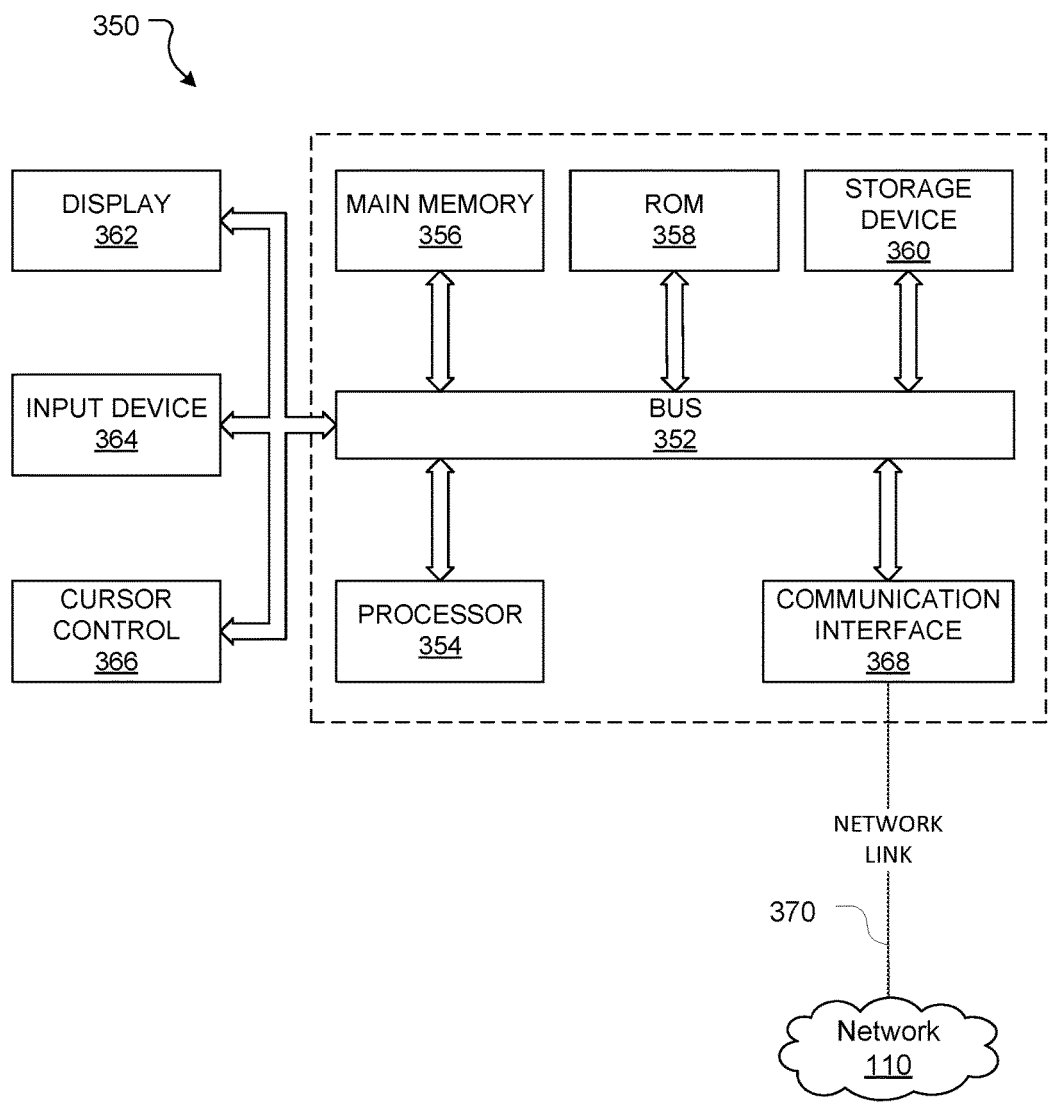
FIG. 3 is a block diagram illustrating a computer system, which may be used to implement various embodiments.

By way of example, FIG. 3 provides a block diagram that illustrates one example of a computer system 350 upon which embodiments of the invention may be implemented. Computer system 350 includes a bus 352 or other communication mechanism for communicating information, and a hardware processor 354 coupled with bus 352 for processing information. Hardware processor 354 may be, for example, a general purpose microprocessor, a graphical processing unit, or other processing unit.

Computer system 350 also includes a main memory 356, such as a random access memory (RAM) or other dynamic storage device, coupled to bus 352 for storing information and instructions to be executed by processor 354. Main memory 356 also may be used for storing temporary variables or other intermediate information during execution of instructions to be executed by processor 354. Such instructions, when stored in non-transitory storage media accessible to processor 354, render computer system 350 into a special-purpose machine that is customized to perform the operations specified in the instructions.

Computer system 350 further includes a read only memory (ROM) 358 or other static storage device coupled to bus 352 for storing static information and instructions for processor 354. A storage device 360, such as a magnetic disk or optical disk, is provided and coupled to bus 352 for storing information and instructions.

In case the computer system 350 is the client device 102, the computer system 350 may be coupled via bus 352 to a display 362 (such as an LCD, LED, touch screen display or other display), for displaying information to a computer user. An input device 364, including alphanumeric and other keys, may be coupled to the bus 352 for communicating information and command selections to processor 354. Another type of user input device is cursor control 366, such as a mouse, a trackball, or cursor direction keys for communicating direction information and command selections to processor 354 and for controlling cursor movement on display 362.

According to one embodiment, the techniques herein are performed by computer system 350 in response to processor 354 executing one or more sequences of one or more instructions contained in main memory 356. Such instructions may be read into main memory 356 from another storage medium, such as a remote database. Execution of the sequences of instructions contained in main memory 356 causes processor 354 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 360. Volatile media includes dynamic memory, such as main memory 356. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 352. Transmission media can also take the form of acoustic or light waves, such as those generated during radio-wave and infra-red data communications.

Computer system 350 also includes a communication interface 368 coupled to bus 352. Communication interface 368 provides a two-way data communication coupling to a network link 370 that is connected to the communication network 110. For example, communication interface 368 may be an integrated services digital network (ISDN) card, cable modem, satellite modem, etc. As another example, communication interface 368 may be a local area network (LAN) card to provide a data communication connection to a compatible LAN. Wireless links may also be implemented. In any such implementation, communication interface 368 sends and receives electrical, electromagnetic or optical signals that carry digital data streams representing various types of information.

Computer system 350 can send messages and receive data, including program code, through the network(s) 110, network link 370 and communication interface 368. In case the computer system hosts the CI management system 106, the computer system 350 may receive an event notification from the SCM system 104 via the network 110, network link 370, and communication interface 368. The received event notification may be executed by processor 354 as it is received, and/or stored in storage device 360, or other non-volatile storage for later execution.

As described previously, the computer system 350 as described above may be configured in a plurality of useful arrangements. In one arrangement, the computer system 350 is a server computer (such as a computer system hosting the CI management system 106) comprising one or more non-transitory computer-readable data storage media stored with one or more sequences of instructions/software modules which when executed cause the computer to perform the operations/techniques that are described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using process steps. The functionality/processing of a given process step could potentially be performed in various different ways and by various different systems or system modules. Furthermore, a given process step could be divided into multiple steps and/or multiple steps could be combined into a single step. Furthermore, the order of the steps can be changed without departing from the scope of the present disclosure. For example, method steps 332 and 333 (i.e., creating and storing the build script 220 in the memory 209) may be performed before step 318 (i.e., launching the repository container 218).

It will be understood that the embodiments disclosed and defined in this specification extends to alternative combinations of two or more of the individual features mentioned or evident from the text or drawings. These different combinations constitute various alternative aspects of the embodiments.

The invention claimed is:

1. A computer-implemented method for testing source code performed by a continuous integration system, the continuous integration system comprising a task definition repository storing a plurality of task identifiers and associated task scripts, the method comprising:

receiving at the continuous integration system an event descriptor from a source code management system, the event descriptor comprising a repository identifier of a repository maintained by the source code management system in which the source code to be tested is maintained;

retrieving a configuration file from the repository maintained in the source code management system in which the source code is maintained, the configuration file comprising one or more build steps and at least one build step comprising at least one task identifier of a task to be executed by the continuous integration system to test the source code;

creating a job descriptor for testing the source code, the job descriptor comprising at least the repository identifier, and at least one build step identifier;
instructing a container management system to test the source code according to the created job descriptor, the container management system configured to:
  launch a controller container configured to retrieve the repository identifier, and the at least one build step identifier, the controller container configured to extract the at least one build step and the task script into an executable build script and store the executable build script in a shared memory;
  retrieve the source code from the repository based on the repository identifier;
  store the retrieved source code in the shared memory;
  launch a build container, the build container configured to retrieve the executable build script and the source code from the shared memory and perform the build on the source code based on the executable build script, the build container further configured to retrieve a task script corresponding to the task identifier of the task from the task definition repository and package build logic associated with the task script into a job description and request a launch container to launch a task container to execute the job description.

2. The method of claim 1, further comprising launching a repository container, the repository container configured to perform the steps of retrieving the source code from the repository and storing the retrieved source code in the shared memory.

3. The method of claim 2, further comprising receiving, at the controller container, permission information for accessing the repository.

4. The method of claim 3, further comprising:
receiving, at the repository container, the repository identifier and the permission information from the controller container, and
accessing the repository using the repository identifier and the permission information to retrieve the source code.

5. The method of claim 1, further comprising:
launching the build container based on a build VM image, an indicator of the build VM image provided in the job descriptor.

6. The method of claim 1 further comprising:
retrieving, by the controller container, results of the build from the build container; and
making the results available for inspection.

7. The method of claim 6, wherein making the results available for inspection comprises forwarding the results to a feedback system.

8. The method of claim 1, further comprising instructing the container management system to launch a container group, the shared memory being mounted in the container group, and the controller container, the build container, and the task container being launched in the container group.

9. The method of claim 1 further comprising detecting that the source code in the repository is updated.

10. The method of claim 9, wherein the method for testing the source code is triggered in response to detecting that the source code in the repository is updated.

11. A continuous integration system for testing source code, the system comprising:
a processor,
a communication interface, and
a non-transitory computer-readable storage medium storing a task definition repository including a plurality of task identifiers and associated task scripts and sequences of instructions, which when executed by the processor, cause the processor to:
  receive at the continuous integration system an event descriptor from a source code management system, the event descriptor comprising a repository identifier of a repository maintained by the source code management system in which the source code to be tested is maintained;
  retrieve a configuration file from the repository maintained in the source code management system in which the source code is maintained, the configuration file comprising one or more build steps and at least one build step comprising at least one task identifier of a task to be executed by the continuous integration system to test the source code;
  create a job descriptor for testing the source code, the job descriptor comprising at least the repository identifier, and the at least one build step comprising the at least one task identifier;
  instruct a container management system to test the source code according to the created job descriptor, and cause the container management system to:
    launch a controller container configured to retrieve the repository identifier, the at least one build step and the task script, the controller container configured to extract the at least one build step and the at least one task identifier into an executable build script and store the executable build script in a shared memory;
    retrieve the source code from the repository based on the repository identifier;
    store the retrieved source code in the shared memory;
    launch a build container, the build container configured to retrieve the executable build script and the source code from the shared memory and perform the build on the source code based on the executable build script, the build container further configured to retrieve a task script corresponding to the task identifier of the at least one task from the task definition repository and package build logic associated with the task script into a job description and request a launch container to launch a task container to execute the job description.

12. The continuous integration system of claim 11, wherein the build container is configured to end the task container once the job description is executed.

13. The continuous integration system of claim 11, wherein the processor is configured to execute instructions that cause the processor to cause the container management system to:
launch a repository container, the repository container configured to perform the steps of retrieving the source code from the repository and storing the retrieved source code in the shared memory.

14. The continuous integration system of claim 11, wherein the processor is configured to execute instructions that cause the processor to cause the container management system to receive, at the controller container, permission information for accessing the repository.

15. The continuous integration system of claim 11, wherein the processor is configured to execute instructions that cause the processor to cause the container management system to:
retrieve, by the controller container, results of the build from the build container; and
make the results available for inspection.

16. The continuous integration system of claim 11, wherein the processor is configured to execute instructions that cause the processor to cause the container management system to: launch a container group, the shared memory being mounted in the container group, and the controller container, the build container, and the task container being launched in the container group.

17. The continuous integration system of claim 11, wherein the processor is configured to execute instructions that cause the processor to detect that the source code in the repository is updated.

18. The continuous integration system of claim 17, wherein the processor is configured to perform testing the source code in response to detecting that the source code in the repository is updated.

19. Non-transient computer readable storage comprising a task definition repository for storing a plurality of task identifiers and associated task scripts and comprising instructions which, when executed by a processor, cause the processor to:
receive at a continuous integration system an event descriptor from a source code management system, the event descriptor comprising a repository identifier of a repository maintained by the source code management system in which the source code to be tested is maintained;
retrieve a configuration file from the repository maintained in the source code management system in which the source code is maintained, the configuration file comprising one or more build steps and at least one build step comprising at least one task identifier of a task to be executed by the continuous integration system to test the source code;
create a job descriptor for testing the source code, the job descriptor comprising at least the repository identifier, the at least one build step and the at least one task identifier;
instruct a container management system to test the source code according to the created job descriptor, and cause the container management system to:
launch a controller container configured to retrieve the repository identifier, the at least one build step and the task script, the controller container configured to extract the at least one build step and the at least one task identifier into an executable build script and store the executable build script in a shared memory;
retrieve the source code from the repository based on the repository identifier;
store the retrieved source code in the shared memory;
launch a build container, the build container configured to retrieve the executable build script and the source code from the shared memory and perform the build on the source code based on the executable build script, the build container further configured to retrieve a task script corresponding to the task identifier of the at least one task from the task definition repository and package build logic associated with the task script into a job description and request a launch container to launch a task container to execute the task script.

20. The non-transient computer readable storage of claim 19, further comprising instructions which, when executed by a processor, cause the processor to launch a repository container, the repository container configured to perform the steps of retrieving the source code from the repository and storing the retrieved source code in the shared memory.

* * * * *

UNITED STATES PATENT AND TRADEMARK OFFICE
CERTIFICATE OF CORRECTION

PATENT NO. : 10,515,005 B1  
APPLICATION NO. : 16/457384  
DATED : December 24, 2019  
INVENTOR(S) : Burrell et al.

Page 1 of 1

It is certified that error appears in the above-identified patent and that said Letters Patent is hereby corrected as shown below:

In the Specification

Column 6, Line 21, replace "feature" with:
-- features --

Column 25, Line 41, replace "pod" with:
-- container group --

Column 25, Line 49, replace "pod" with:
-- container group --

Column 25, Line 58, replace "pod" with:
-- container group --

Column 25, Line 61, replace "pod" with:
-- container group --

Column 25, Line 67, replace "steps" with:
-- script --

Signed and Sealed this
Twenty-fourth Day of March, 2020

Andrei Iancu
*Director of the United States Patent and Trademark Office*